March 21, 1950 G. C. ELTENTON ET AL 2,501,599
PHOTOELECTRIC COLORIMETER
Filed Nov. 8, 1947 3 Sheets-Sheet 1

Inventors: George C. Eltenton
Marvin B. Fallgatter
By their Attorney:

March 21, 1950   G. C. ELTENTON ET AL   2,501,599
PHOTOELECTRIC COLORIMETER

Filed Nov. 8, 1947   3 Sheets-Sheet 2

Inventors: George C. Eltenton
Marvin B. Fallgatter
By their Attorney:

March 21, 1950  G. C. ELTENTON ET AL  2,501,599
PHOTOELECTRIC COLORIMETER

Filed Nov. 8, 1947  3 Sheets-Sheet 3

Inventors: George C. Eltenton
Marvin B. Fallgatter
By their Attorney:

Patented Mar. 21, 1950

2,501,599

UNITED STATES PATENT OFFICE 2,501,599

PHOTOELECTRIC COLORIMETER

George C. Eltenton, Berkeley, and Marvin B. Fallgatter, San Leandro, Calif., assignors to Shell Development Company, San Francisco, Calif., a corporation of Delaware Application November 8, 1947, Serial No. 784,924

4 Claims. (Cl. 250—218)

This invention relates to an apparatus and a method for measuring the relative color densities of fluids and pertains more particularly to a photoelectric colorimeter for determining and recording the relative color density or optical transmissivity of continuously flowing fluids. The use of photoelectric analytical apparatus for process control in plant production or manufacturing has been so far limited, as little advance has been made in the development of instruments of simple and sturdy design adapted to be used in continuous flow processes.

Photoelectric instruments to be used for continuous operation must necessarily contain means of compensating for the inherent errors in such instruments. The sources of error in a photoelectric analytical instrument, such as, for example, a photoelectric colorimeter, may be caused by variations in the amount of light emitted from the light source due to variations in the line voltage to said light source, deterioration of the photocell sensitivity, contamination, by dust, etc., of the light source, collimating slits or photocell surfaces, or contamination of the inner surfaces of the inspection or test chamber by the continuously flowing fluid to be tested. In photoelectric instruments incorporating two or more photocells, there may be differential deterioration of the photocell sensitivities as well as differential contamination of the lamps, collimating slits and photocell surfaces.

Photoelectric colorimeters designed and used for colorimetric determinations in the laboratory have been based on the principle of comparing the color of an unknown fluid against the color of a known standard colored solution, filter or glass disc, etc. Generally, colorimetric apparatuses of this type have not been entirely satisfactory, as only individual samples could be tested. The test procedure was therefore time consuming, the apparatus had to be cleaned after each test, and it was usually difficult or impossible to test a continuously flowing fluid.

It is therefore an object of the present invention to provide an apparatus, incorporating photoelectric means, for detecting, measuring and recording changes in color density of a continuously flowing fluid stream.

It is also an object of the invention to provide a photoelectric colorimeter having means for compensating for variations in the line voltage of the light source.

It is a further object of the present invention to provide a photoelectric colorimeter incorporating means for detecting and compensating for a decrease in photocell sensitivity or for contamination of the light source, collimating slit or photocell surface.

A further object of the present invention is to provide a photoelectric colorimeter for analyzing a continuously flowing fluid which exerts a cleaning action on the test chamber of the colorimeter, said colorimeter having means adapted to detect any differential deterioration of the glass surfaces of the test chamber.

It is a still further object of this invention to provide a photoelectric colorimeter for determining the color density of a continuously flowing fluid while incorporating into said colorimeter a standard colored solution, disc or filter.

Other objects and advantages of the invention will become apparent from the following detailed description taken with reference to the drawings wherein.

Figures 1, 2:
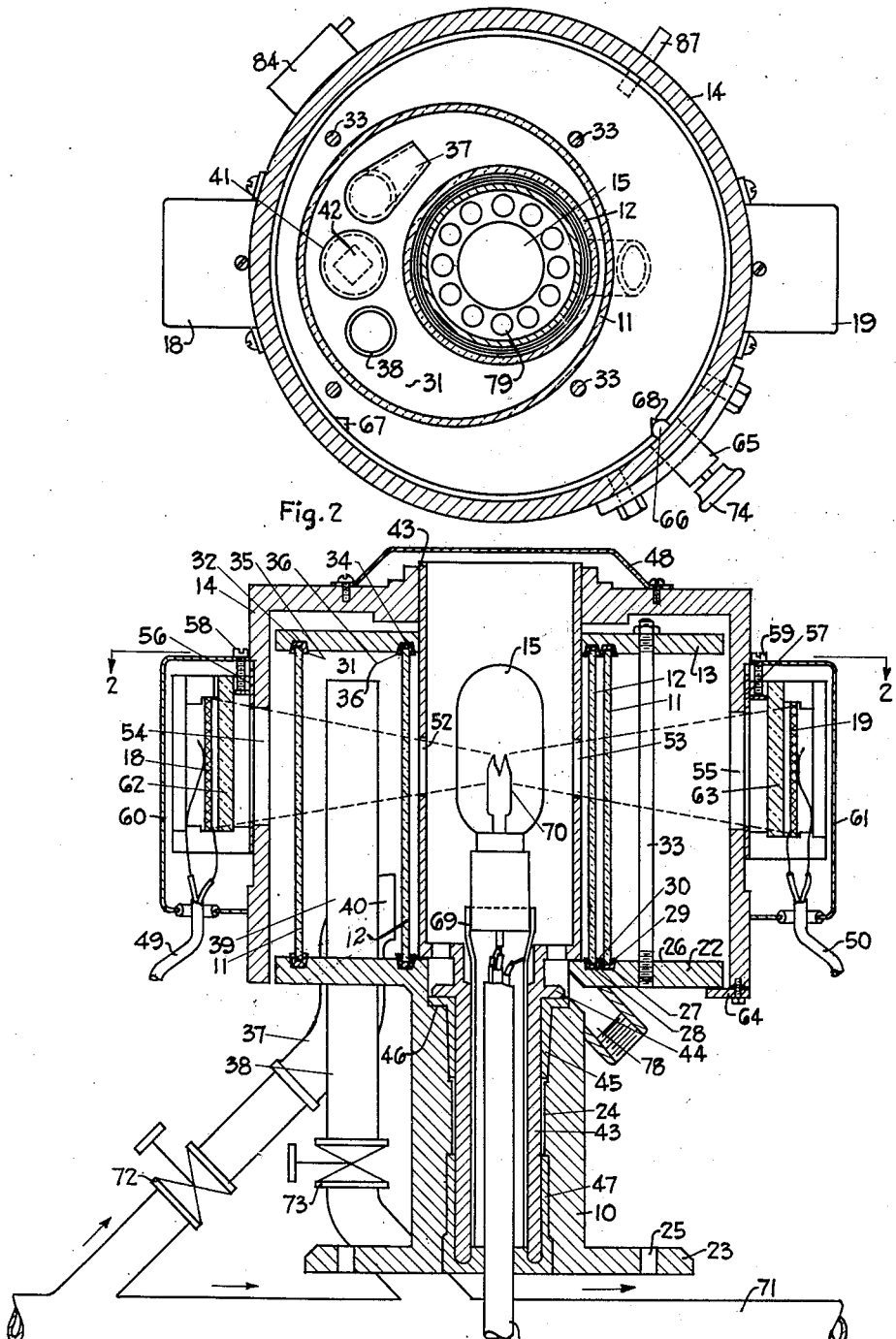
Figure 1 is a view, partially in cross section, of a preferred embodiment of the photoelectric colorimeter of the present invention.
Figure 2 is a cross sectional view taken along line 2—2 in Figure 1.

A preferred embodiment of the present photoelectric colorimeter is shown in Figures 1 and 2. It comprises essentially a base member 10, transparent cylinders 11 and 12, cell cover 13, housing or carriage member 14, light source 15, photocell means 18 and 19 and fluid inlet and outlet means 37 and 38 (Figure 2) respectively.

The base member of pedestal 10 may be of any shape having upper and lower flange members 22 and 23, respectively, and an axial bore 24 passing therethrough. The lower flange member 23 may be equipped with bolt holes 25 whereby the base member may be fixedly secured by bolt means to any suitable structure. Formed or cut in the upper face 26 of the upper flange 22 are two eccentric circular grooves 27 and 28 of different diameters in which the two transparent cylinders 11 and 12 may be positioned and sealed in any suitable manner, as by gaskets 29 and 30. The transparent cylinders 11 and 12 may be of any desired size or height and of any transparent material such as glass, quartz, various types of plastics, or any material that will be unaffected by the fluid being analyzed. The smaller or inner groove or channel 28 is coaxial with the axial bore 24 while the larger surrounding groove 27 is eccentric with regard to groove 28 so that preferably, the distance between the grooves at their most widely separated points is several times the distance at diametrically opposite points. Thus when the transparent cylinders 11 and 12 are mounted in the eccentric grooves 27 and 28, a fluid container or cell 31 is formed between the cylinders which possesses sections of varying width or thickness.

If desired, the top of the fluid or absorption container or cell 31 may be closed by a cell cover 13 which may be secured to the upper flange member 22 of the base member 10 by any suitable means, as by bolts 33. The cell cover 13 also may have eccentric grooves 32 and 34 cut therein in which the upper edges of the cylinders 11 and 12 may be positioned and sealed by gaskets 35 and 36 of a suitable fluid-resistant material. The fluid cell 31 is equipped with suitably disposed fluid inlet and outlet means, 37 and 38 respectively. In this embodiment, both the fluid inlet 37 and outlet 38 pass through the bottom of the fluid cell 31, or the top flange member 22 of the base unit 10. The fluid outlet 38 is equipped with a standpipe 39 located within the cell 31 to insure circulation of the fluid sample therein. The fluid inlet 37 may have a short nozzle 40 attached whereby the influent fluid is directed toward the smallest section or width of the fluid cell 31 and near the bottom thereof.

In the event that the sample being tested is a fluid, there is a tendency for the influent liquor to circulate in the widest or less restricted portion of the fluid cell 31, causing said fluid to stagnate in the narrower portions of said cell 31, thus allowing a non-representative sample to be analyzed while at the same time causing differential contamination or beclouding action on the inner surfaces of the transparent cylinders 11 and 12. Differential contamination of an instrument of this type is one of the primary causes of error, especially in instruments used with continuously flowing liquids. In the present apparatus by circulating the liquid sample through the narrower portions of the cell 31 as it enters, a representative sample is available for analysis at all times while the influent liquid exerts a washing action on the inner walls of the cell 31. While the outer cylinder 11 may be eccentrically positioned about and at any distance from the inner cylinder 12, the distance between the two cylinders where they are closest to each other is preferably large enough to allow a sufficient flow of liquid therethrough to flush the walls of said cylinders. Any impurities that settle out of the fluid sample being analyzed may be removed through a drain port 41 (Figure 2) located between the cylinders 11 and 12 in the upper flange member 22 of the base member 10. This drain port 41 is normally closed by any suitable means as by a plug 42, valve, or the like.

Mounted rotatably and in coaxial relationship with the axial bore 24 of the pedestal 10 is a housing member 14, rotatably mounting the photocell means 18 and 19 adjacent the outer cylinder 11. The housing member 14 has a downwardly extending hollow, preferably tubular, pivot member 43 in which a light source 15 may be fixedly mounted in any suitable manner. The lower end of the pivot member 43 may be mounted rotatably in the axial bore 24 of the pedestal 10 in any suitable manner. One method of mounting said pivot member 43 is shown in Figure 1 wherein an outwardly extending flange means 44 is fixedly secured to or integrally formed on the outer wall of the pivot member 43, said pivot member being rotatable on a bearing 45 which is fixedly mounted on a shoulder 46 within the axial bore 24 of the pedestal 10. The lower end of said pivot member 43 may rotate in a second bearing 47.

The housing member 14 may be of any desired shape. In the embodiment illustrated in Figure 1, the housing member 14 is shown as a drum-like structure surrounding the cylinders 11 and 12, and having an open lower end which is substantially closed by the upper flange 22 of the pedestal 10 when the housing is mounted in its operating position. The drum-shaped housing member 14 is integrally formed with or fixedly secured to the upper end of the housing pivot member 43 in any suitable manner as by welding, screw-threads, etc. The top of the housing pivot member 43 is preferably open to allow heat from the lamp 15 to be dissipated more readily. It may be desirable however to cover the open upper end of said pivot member by a perforated dust cap or ventilator 48 in order to keep dust off the light source 15. The drum-shaped housing 14, which is preferably blackened inside to cut down reflected light and which covers the entire instrument, offers substantial protection to the glass cylinders 11 and 12.

The two light sensitive or photocell means 18 and 19 which may be photocells of the self-generating or variable resistance type or phototubes, may be fixedly secured in any suitable manner to the outer walls of the housing 14, said photocell means preferably being located substantially opposite each other. The electrical conduits 49 and 50 leading to the photocells 18 and 19 and the electrical conduit 51 to the light source 15 should be of sufficient length so that the housing 14 and attached photocells and lamp may be freely rotated. A pair of collimating slits 52 and 53 are cut or formed in the walls of the tubular pivot member 43, said slits preferably being substantially opposite each other and preferably opposite the brightest portion of the light source 15. Disposed radially from slits 52 and 53 is a second pair of slits 54 and 55 in the housing 14. If desired, lens systems may be used for collimating the light from lamp 15 into suitable beams that would be defined by slits 52 and 53. When the photocells 18 and 19 are secured to the housing 14 they are positioned with regard to slits 54 and 55 so that the light beams emanating from the light source 15 fall on the photocells. The size of the slits 52, 53, 54 and 55 is therefore generally determined by the effective area of the photocells 18 and 19. The area of the slits 54 and 55 may be varied by any suitable type of adjustable diaphragm means as by movable screens or slides 56 and 57 which may be controlled by adjustment screws 58 and 59. Dust or other contaminating materials may be substantially excluded from the photocell surfaces by covering them with shields or dust caps 60 and 61. If desired, removable light filters 70 and 79 may be inserted in front of the photocells 18 and 19.

Since a considerable amount of heat may be generated by the light source 15, the pedestal 10 may be equipped with an air inlet 78 and the tubular pivot member 43 may have air circulation holes 79 whereby air may be blown through the tubular pivot member 43 to cool it. If a sample of a volatile and inflammable liquid is to be analyzed the blowing of air through the instrument in the above-described manner will also remove any explosive vapors from the vicinity of the light source 15, said vapors being originally due to a possible leaking gasket at the top or bottom of the cylinders 11 and 12. While the instrument is being used a retaining ring or plate 64 may be secured to the bottom of the housing 14 so as to extend under the upper flange 22 of the pedestal 10 thus preventing the housing 14 from being accidentally lifted.

When readings are being taken with the above-described instrument the movable housing member 14 is positioned fixedly with regard to the base member 10 by any suitable anchoring means. One such anchoring means is shown in Figure 2 comprising a mounting 65 fixedly secured to the lower edge of said housing 14 having a spring-loaded plunger 66 extending therethrough to engage spaced positioning notches, slots or terminals 67 and 68 which may be cut or formed in, or near, the periphery of the upper flange member 22 of the base member 10, preferably about 90° apart on said periphery. The location of one notch 67 is selected by the setting of the cooperating plunger 66 when the movable housing 14 is positioned with respect to the eccentric cylinders 11 and 12 so that equal thickness of fluid between said cylinders 11 and 12 will be interposed between the light source 15 and the photocells 18 and 19.

The light source 15 may be mounted in any suitable manner, as in a socket 69, preferably in a fixed position relative to the pivotal member 43 and within the inner transparent cylinder 12 whereby the light source is rotated with the housing member 14 thus maintaining an optical relation between the light source 15 and the photocells 18 and 19 such that the rotation has substantially no optical effect other than the interposition of different cell-depths or thicknesses of fluid. A light source 15 emitting white light is normally used. The spectral characteristics of this light may be varied if desired by inserting suitable filters. The use of filters or other types of light, e. g. monochromatic light, may be useful in determining the hue of the fluid being analyzed. Determination of hue may be also facilitated by the use of different lamp characteristics, i. e. by changing the lamp filament temperatures so that the transmission measurements can be applied to broader color characteristic determinations.

Figure 3:
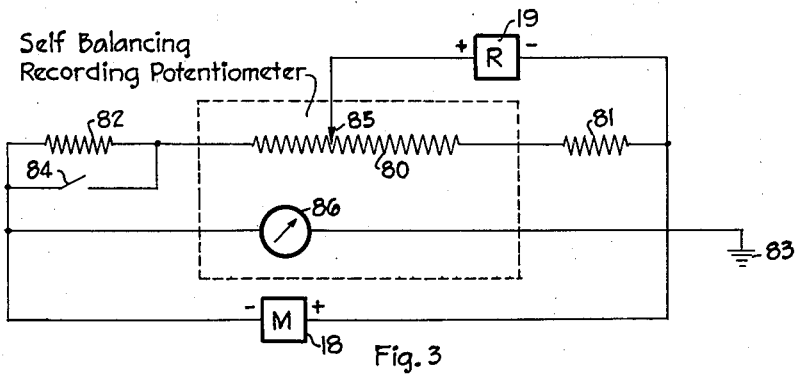
Figure 3 is an electrical diagram of a potentiometer device used in the system of the present invention.

Line voltage variations that normally influence the brightness of the light source may be compensated for by use of a ratio-measuring circuit such, for example, as that shown in Figure 3. In this form of circuit, 80 represents a tapped resistor or a slidewire, while 81 and 82 are resistors which may be of the fixed or the variable type. By suitable choice of resistance values, the instrument may be made to indicate, by the position of the movable contact 85 along the slidewire 80, any desired range of color density or transmissivity. The measuring photoelectric cell 18 is connected across the combined resistors 80, 81 and 82, and a null-indicating device 86 is connected across these same resistors. Reference photoelectric cell 19 is connected across resistor 81 and the adjacent portion of slidewire 80. The two photoelectric cells have opposite polarities connected to resistor 81, and this point may be grounded to the instrument frame or housing as at 83. Switching means 84 are provided for short-circuiting resistor 82 from the circuit when the colorimeter is being checked or zeroed as described hereinbelow.

The operation of this circuit is as follows. Briefly it may be said that if movable contact 85 is brought to such a point that the resistance across photoelectric cell 19 (R) bears the same relation to the total resistance as the photoelectric current delivered by photoelectric cell 18 (M) bears to the photoelectric current delivered by photocell 19 (R), then the null indicator 86 will show no deflection; while otherwise the deflection of the null indicator will show which way to move contact 85 to obtain this balance. Furthermore, this balance may be obtained automatically and substantially continuously by linking null indicator 86 with a mechanical system for moving contact 85, as is done in self-balancing potentiometers in a manner well known in the art. Since the aforementioned resistance ratio may be simply related to the position of a pointer 85 sliding on resistance 80, or a pen on a chart of a recording self-balancing potentiometer; while the aforesaid ratio of photoelectric currents is equal to the ratio of illumination of the two photoelectric cells, it follows that a direct record or indication of relative illuminations will be given by this arrangement. It is understood that other arrangements may be used alternatively, in a similar manner, although the arrangement described is a preferred one.

From the above description of the apparatus and electrical circuit it is evident that by utilizing eccentrically mounted glass cylinders 11 and 12, the radial thickness of a fluid between said cylinders will vary with rotation of the housing about the axis of the instrument or about the smaller cylinder 12. Thus by rotation of the housing 14 which carries the lamp 15, slits 52, 53, 54 and 55 and photocells 18 and 19, the two beams of light from the lamp 15 which pass through the oppositely located collimating slits may be made to traverse any selected thickness of fluid between the eccentric cylinders 11 and 12 providing the fluid level is above the light beams. For ease of description it will be assumed that the fluid being analyzed is a petroleum oil. When the housing 14 is positioned with relation to the eccentric cylinders 11 and 12 as shown in Figure 2 the light beam to one of the photocells 18 will be traversing the maximum oil thickness or layer (say 35 mm.) while the light beam to the other photocell 19 traverses the minimum oil layer (say 5 mm.). This position of the photocells may be termed the measuring position. For a quick setting of the instrument to this position at any time it is only necessary to rotate the housing 14 until the spring-loaded plunger 66 slips into positioning notch 63 as shown in Figure 2. With the housing 14 located in this measuring position the two light beams to photocells 18 and 19 will traverse paths involving a difference in oil thickness of 35-5 or 30 mm., so that the effect of the light striking the measuring photocell 18 will differ from that striking the reference photocell 19 by an amount which depends on the absorption of light by the oil, the optics of the system, the incident light distribution and the photocell sensitivities. When this group of factors is kept constant as it is when the lamp 15, slits 52, 53, 54 and 55 and photocells 18 and 19 are rigidly mounted, the ratio of the light falling on the photocells is an indication of the absorption of the oil. Thus by connecting the two photocells 18 and 19 in a ratio-measuring circuit as shown in Figure 3, the readings obtained therefrom may be correlated with the color density measured visually by any standard colorimeter.

Since one of the advantages of the instrument of the present invention is its adaptability for either continuous operation or for individual runs or samples, provision is made for minimizing and detecting the incidence of errors such as might be caused by: (1) line voltage variations changing the total light from lamp 15, (2) differential deterioration of the photocell sensitivities, (3) differential contamination, by dust, etc., of the lamp, slits and photocell surfaces and (4) differential contamination of the glass surfaces by the oil in the absorption cell 31. Taken in the above order, these sources of error may be minimized and substantially eliminated by (1) using a ratio circuit, as shown in Figure 3, and matched photocells, (2) providing shutter means for varying the area of each photocell exposed to the light beam, (3) using a symmetrical design of the instrument and providing suitable dust shields, and (4) flowing the fluid sample over all the surfaces of the fluid cell 31.

An especially important feature of the present invention is its ability to detect the incidence of errors due to the above-mentioned causes. In order to accomplish this purpose, it is important that the fluid or absorption cell 31 be so constructed that in one position of the instrument, which will be called its zero position, the fluid thicknesses in the paths of the two light beams are equal. With the two oil thicknesses equal, the color density or transmissivity of the oil does not affect the reading obtained and it is therefore possible to check the instrument to ascertain whether conditions have remained constant or if other errors have been introduced.

In operation, the colorimeter of the present invention is suitably mounted in an upright position with its inlet 37 and outlet means 38 connected into a fluid flow line 71 or a by-pass thereof. As shown in Figure 1, such a by-pass normally comprises valves 72 and 73, whereby the fluid flow may be controlled when readings are being made or shut off when the instrument is not in use or is being cleaned. When making continuous readings or recording with the instrument, both inlet and outlet valves 72 and 73 are opened allowing the fluid to flow through the fluid or absorption cell 31. The instrument is then checked or zeroed to detect cumulative errors due to unequal aging of the photocells 18 and 19 or to the accumulation of foreign matter in unequal proportions on the walls of the absorption cell 31, in the slits or on the photocells. The housing 14 is moved into zeroing position by grasping handle 74 (Figure 2) to withdraw plunger 66 from notch 68 and rotating said housing 14 until the plunger is opposite the zero-positioning notch 67 at which time the plunger is released, allowing it to enter said notch 67. While the housing 14 is being rotated to its zero position, the switch 84 (Figure 3) is closed, which short-circuits resistor 82 from the circuit to place the zero reading of the potentiometer 80 on its scale. The closing of switch 84 may be accomplished automatically by having the switch mounted in any suitable manner on the rotatable housing 14 as shown in Figure 2. When the housing is rotated to the zeroing position, the switch 84 is actuated by a leverarm 87 which may be fixedly secured to the pedestal 10. With the instrument in its zeroing position, the thicknesses of the fluid in the paths of the two light beams and therefore, when the instrument is in proper adjustment, the outputs of both photocells 18 and 19 are equal so that no voltage will be noted on the indicating device 86 and the sliding contact 85 will seek the zero reading of the potentiometer 80 when a self-balancing potentiometer is used. If a reading other than zero is indicated, adjustments may be made to screen 56 or 57 to restore the instrument to zero balance. To obtain a color density or spectral transmission reading of the fluid being analyzed, the housing is rotated in the manner previously described until the positioning plunger 66 is located in the measuring notch 68, at which time switch 84 is opened putting resistor 82 back in the circuit. With the instrument now set in this measuring position, the thicknesses of the fluid intercepting the two light beams are substantially different, causing a differential output of the photocells 18 and 19. This voltage difference shown as appearing on the indicating device 86, if applied to the self-balancing potentiometer, causes the sliding contact 85 of the potentiometer 80 to seek a new balance point. The reading on the instrument obtained by this new balance point is an indication of the amount of light being transmitted through the unknown fluid being analyzed. A sample of the fluid in the absorption chamber 31 may be drained off and tested in a standard colorimeter to obtain a reading corresponding to that of the potentiometer 80. By testing a number of differently colored fluid samples with the present instrument and with a standard colorimeter, a calibration curve may be obtained by which the potentiometer readings of the instrument of the present invention may be conveniently translated into standard readings.

The design of the present apparatus permits to check for the cause of any error which may appear when readings are taken. For example, if readings were taken in the original zero and measuring position at the beginning of a set of tests, and a subsequent zero reading was different from that originally taken, an error is indicated which may be due to either of the two following sets of conditions. First, there may be unequal deterioration in the sensitivity of the photocells or an accumulation of dust on the slits 52, 53, 54 and 55, lamp 15 or photocells 18 and 19; or, second, there may be unequal contamination of the glass walls of the absorption cell 31. The absorption cell 31 may be then drained and readings taken in both the zero and measuring positions of the instrument again. If both readings disagree with the original values by approximately the same amount, the error is due to unequal deterioration of the photocells or dust on the slits, lamp or photocells. Compensation for this error may be made by resetting one of the adjustment screws 58 or 59 thus opening or closing slide or shutter 56 or 57 until the new zero reading equals the original zero reading. If, however, after making the above comparison between the original values obtained and the new values, it is found that the differences are not the same, the indicated error is due to unequal contamination of the glass walls of the absorption cell. This may be remedied by cleaning the cell in any suitable manner, as by flushing it with a solvent, cleaning solution or the like.

Figure 4:
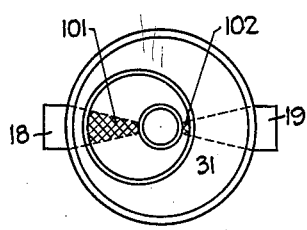
Figures 4 and 5 are diagrammatic top views of the device of Figure 1 with the top of the housing removed and the photocells in operating positions.
Figure 7:
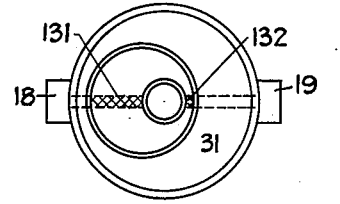
Figure 8:
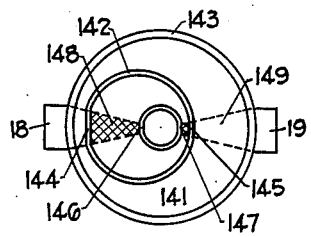
Figure 9:
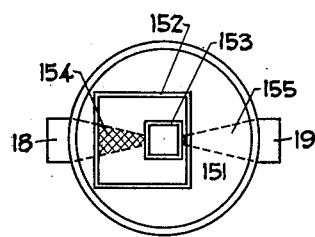

Although the above-described embodiment of the present invention may be used to determine the amount of light transmitted by a fluid of any color and over any range of said color, certain modifications may be made to the instrument 10 when it is used to analyze a substantially clear or water-white fluid, e. g. kerosene. It will be noted that since the transparent cylinders 11 and 12 are eccentrically positioned, the fluid in the absorption cell 31 that is cut by the diverging light beams (represented by dotted lines in Figures 4 through 9) constitutes a lens when the instrument is in its measuring position. This is illustrated diagrammatically in Figure 4 wherein the shaded or cross-hatched portions 101 and 102 represent the lenses of fluid. These lenses of fluid tend to change the intensity of the light passing through the fluid so as to give incorrect readings on various colorless fluids. For example, if a reading is taken with the instrument in its measuring position and with only air in the absorption cell 31, and then a second reading is taken after filling the cell with a nearly colorless liquid such as kerosene, the reading in the second case might indicate that the transparency of the kerosene was greater than that of an absolutely transparent medium because of the lens effect of the segments of fluid. Effects of refraction of this type may be reduced by use of slits or lenses that permit only parallel beams 131 and 132 of light to pass through the liquid, as shown in Figure 7. The lens effect may be entirely eliminated if the absorption cell has parallel walls. As diagrammatically shown in Figure 8 the absorption cell 141 may comprise two transparent cylinders 142 and 143 having diametrically opposing surfaces flattened slightly at 144, 145, 146 and 147 so that the light beams 148 and 149 pass through parallel walls which do not refract the light. Another embodiment is shown in Figure 9 wherein the parallel walls of the absorption cell 151 comprise transparent rectangular members 152 and 153 through which light beams 154 and 155 may pass without being distorted or refracted, the member 152 being linearly movable as described hereinbelow with regard to Figure 10.

Figure 5:
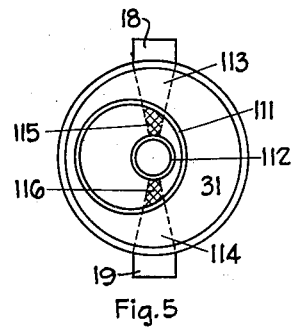
Figure 6:
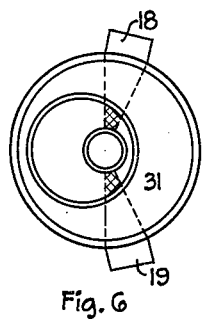
Figures 6, 7, 8 and 9 are diagrammatic top views of modifications of the device illustrated in Figures 1, 2, 4 and 5 with the top of the housing removed.

Another slight source of error that may be introduced into readings, taken with the instrument in its zero position, is due to the use of eccentrically positioned cylinders. As shown in Figure 5 the segments of fluid between the eccentric cylinders 111 and 112 that are cut by the light beams 113 and 114 are in the form of prisms 115 and 116 which slightly distort the instrument reading in its zero reading position. The distortion errors may be compensated for by positioning the photocells 18 and 19 on the housing 14 so that the angle between them is slightly less than 180 degrees, as shown in exaggerated form in Figure 6. Use of an absorption cell 151 constructed as shown in Figure 9 and previously described will entirely eliminate this source of error.

One of the advantages of the present colorimeter is that it may be readily zeroed or checked for source of error while the sample fluid intercepts the light beams, whereas conventional colorimeters are usually checked with a reference liquid, such as water, in the absorption or sample cell. It has been found advantageous to check the instrument with the sample in the absorption cell as this allows both the checking and measuring operations to be made under substantially the same spectral conditions. Thus the photocells are not exposed to extreme operating conditions as only an average amount of light falls on the photocells when they are being checked.

Figure 10:
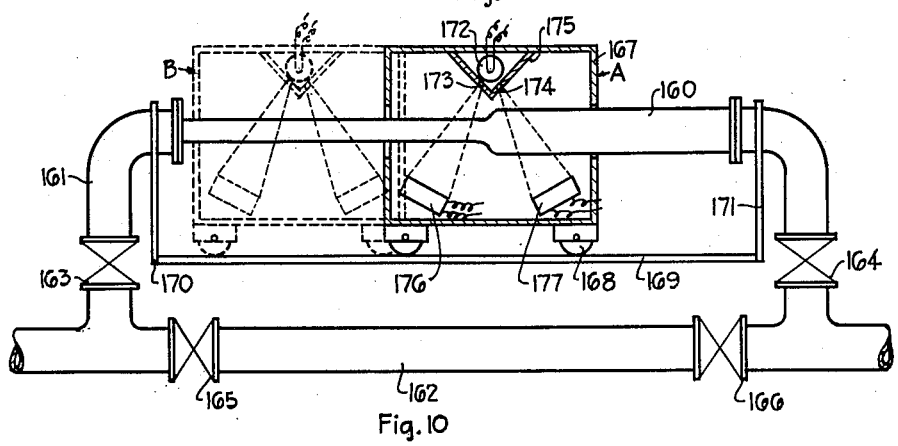
Figure 10 is a diagrammatic view, partly in cross section, of another embodiment of the present invention.

Although the embodiments of the colorimeter that have been described have all been limited to a housing adapted for rotational motion about the absorption cell or test chamber 31, it is evident that a similar colorimeter could be adapted to be mounted for longitudinal motion adjacent a transparent portion of a fluid pipe line. An important feature of the colorimeter, when used with continuously flowing fluids, is that fluid depths of equal and unequal thicknesses be interposed between the light source and the photocells when the instrument is in its checking and measuring positions, respectively. This arrangement of the instrument with regard to the absorption cell also may be achieved by an arrangement of the light and photocells, as shown in Figure 10. In this embodiment the absorption cell 160 comprises a section of transparent conduit in a by-pass 161 of a fluid flow line 162, said conduit 160 being formed into portions having two different thicknesses. Valves 163 and 164 in the by-pass and 165 and 166 in the flow line may be set to control the desired flow therethrough. Movably mounted for longitudinal movement along said absorption cell 160 is the colorimeter housing 167. The housing may be mounted in any suitable manner as, for example, on wheels 168 which move along a track 169 suspended from the by-pass 161 by rods 170 and 171. Contained within the housing 167 are the elements of the first embodiment namely, a light source 172, a light shield 175 having collimating slits 173 and 174 therein, and photocells 176 and 177, all of said elements being mounted rigidly to said housing in any suitable manner. Thus, it will be seen that when the colorimeter is connected to a power source and the housing 167 is in its measuring position A, as shown in Figure 10, the beams of light from the light source 172 pass through portions of the absorption cell having different thicknesses and therefore containing different depths of the fluid to be measured which will in turn result in a measurable difference in current output between the two photocells 176 and 177. This difference in output may be measured, indicated or recorded by use of an electrical circuit as shown in Figure 3 and previously described. Now, when the colorimeter housing 167 is moved to its checking or zeroing position B, equal thicknesses or depths of fluid in the conduit are interposed between the light source 172 and the photocells 176 and 177 so that the illumination of the photocells is equal, thus resulting in an equal output therefrom, if they are in correct adjustment.

Figure 11:
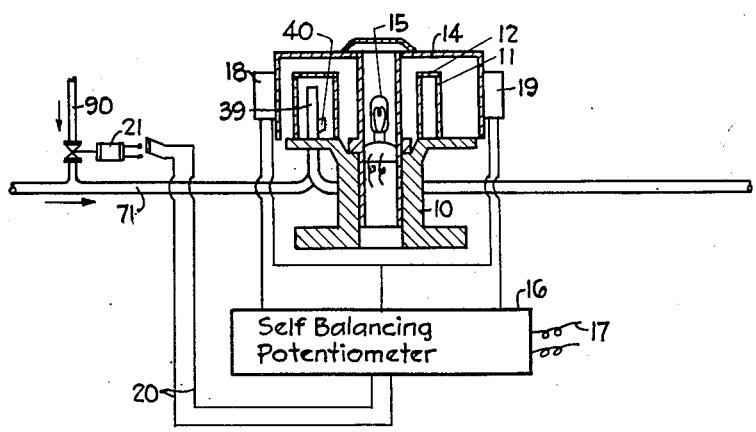
Figure 11 is a diagrammatic representation of a control system embodying the present invention.

In practice, the colorimeter of the present invention may be installed in a fluid flow line 71, as shown in Figure 11, to control the color of the flowing fluid and/or to record changes in the spectral transmission of the fluid. This may be accomplished by connecting the photocells 18 and 19 with a self-balancing potentiometer or recorder-controller 16, such for example as manufactured by the Brown Instrument Company (Bulletin No. 15-4, 1942), the Tagliabue Manufacturing Company (Catalog No. 1101E, 1939), the Leeds-Northrup Company (Catalog No.

33–161, 1940), etc. The self-balancing potentiometer and controller 16, which is supplied with an operating current from any desired source through leads 17, rebalances itself, in a well-known manner, after any condition of unbalance caused by variations of the currents supplied by the photocells 18 and 19. In rebalancing itself, the recording and controlling potentiometer 16 delivers an energizing current, which serves to produce the desired record and which is also applied through leads 20, to control the degree of closure of an automatic valve 21 which in turn may control the flow of a colored fluid from fluid conduit 99 into the main fluid stream 71. For example, if the color of the fluid in the flow line 71 became less transmissive it would change the output of the photocells 18 and 19, thus causing a change in the recorder-controller 16 which in turn would reset the valve 21 so that the amount of colored fluid entering the main flow line 71 would be decreased.

It is understood that all examples were given hereinabove merely by way of illustration and that the scope of the present invention and its application for purposes of industrial control are in no way limited thereby, being defined only in the claims hereinbelow.

We claim as our invention:

1. An apparatus for measuring the optical transmissivity of a fluid, comprising a housing, a source of light rays positioned centrally of said housing, first and second light-sensitive means carried by said housing on diametrically opposite sides from said light source, transparent annular container means surrounding said light source within said housing, said annular container means having an inner wall concentric with said light source and an outer wall eccentric therewith, means for introducing a light-transmissive liquid into said transparent container means, and means for rotating said housing and said light-sensitive means with regard to said annular container about an axis transverse to a straight line passing through said light-source and said two light-sensitive means so as to change the ratio of the lengths of the paths of the rays from said source to said first and to said second light-sensitive means through the liquid in said container.

2. The device of claim 1, comprising latch means for clamping said housing with regard to said annular container in a first position wherein said ratio of path lengths has a value of one and in a second position wherein said ratio has a maximum value.

3. An apparatus for measuring the optical transmissivity of a fluid, comprising a frame member, a source of light rays and first and second light-sensitive means supported by said frame member at fixed distances from each other, transparent container means disposed in the paths of travel from said source to each of said light-sensitive means, means for introducing a light-transmissive fluid into said transparent container means, and means for displacing said frame member and said container with regard to each in such a manner as to change the relative lengths of the paths of the rays through said light-transmissive fluid from said source to said first and to said second light-sensitive means.

4. An apparatus for measuring the optical transmissivity of a fluid, comprising a frame member, a source of light rays and first and second light-sensitive means supported by said frame member at fixed distances from each other, transparent container means disposed in the paths of travel from said source to each of said light-sensitive means, means for introducing a light-transmissive fluid into said transparent container means, and means for displacing said frame member and said container with regard to each in such a manner as to change the relative lengths of the paths of the rays through said light-transmissive fluid from said source to said first and to said second light-sensitive means whereby the amount of light received by one of said light-sensitive means from said light source may be compared with that received by the other light-sensitive means for a relative position of said frame member and said container where the ratio of the path traversed by the rays through said light-transmissive fluid between said light source and the first light-sensitive means to the path traversed thereby through said light-transmissive fluid between said light source and the other light-sensitive means has a maximum value and for a relative position of said frame and said container where said ratio has a value of one.

GEORGE C. ELTENTON.
MARVIN B. FALLGATTER.

REFERENCES CITED

The following references are of record in the file of this patent:

UNITED STATES PATENTS

| Number | Name | Date |
| --- | --- | --- |
| 1,471,342 | Logan | Oct. 23, 1923 |
| 2,193,315 | Evelyn | Mar. 12, 1940 |
| 2,287,322 | Nelson | June 23, 1942 |
| 2,299,529 | Grampton | Oct. 20, 1942 |
| 2,301,401 | Hennessy et al. | Nov. 10, 1942 |
| 2,358,338 | Lilja et al. | Sept. 19, 1944 |
| 2,398,904 | Libman et al. | Apr. 23, 1946 |